(12) United States Patent
MacLean et al.

(10) Patent No.: US 7,131,061 B2
(45) Date of Patent: Oct. 31, 2006

(54) SYSTEM FOR PROCESSING ELECTRONIC DOCUMENTS USING PHYSICAL DOCUMENTS

(75) Inventors: Allan MacLean, Cambridge (GB); Jean-Luc Meunier, Saint Nazaire les Eymes (FR)

(73) Assignee: Xerox Corporation, Stamford, CT (US)

( * ) Notice: Subject to any disclaimer, the term of this patent is extended or adjusted under 35 U.S.C. 154(b) by 664 days.

(21) Appl. No.: 09/683,200

(22) Filed: Nov. 30, 2001

(65) Prior Publication Data

US 2003/0103238 A1 Jun. 5, 2003

(51) Int. Cl.
*G06F 17/21* (2006.01)

(52) U.S. Cl. .................. 715/512; 715/501.1; 715/530; 715/776

(58) Field of Classification Search ............... 715/512, 715/513, 511, 501.1, 530, 776; 178/19.01
See application file for complete search history.

(56) References Cited

U.S. PATENT DOCUMENTS

| | | | |
|---|---|---|---|
| 5,555,099 A * | 9/1996 | Telle .......................... | 358/401 |
| 6,288,719 B1 * | 9/2001 | Squilla et al. .............. | 715/805 |
| 6,339,431 B1 * | 1/2002 | Ohmori et al. ............. | 345/619 |
| 6,546,152 B1 * | 4/2003 | Hou ............................ | 382/284 |
| 6,722,574 B1 * | 4/2004 | Skantze et al. ............. | 235/494 |

FOREIGN PATENT DOCUMENTS

| | | |
|---|---|---|
| EP | 0 568 161 A1 | 11/1993 |
| EP | 0 840 199 A2 | 5/1998 |
| GB | 2 306 669 A | 5/1997 |
| GB | 2306669 A * | 5/1997 |
| WO | WO 99/50736 A1 | 10/1999 |
| WO | WO 99/50751 A1 | 10/1999 |
| WO | WO 99/50787 A1 | 10/1999 |

OTHER PUBLICATIONS

U.S. Appl. No. 09/340,748 entitled "Dual Video Camera System For Scanning Hardcopy Documents", filed Jun. 28, 1999.
U.S. Appl. No. 09/643,628, entitled "Encoded Sheet Material And System For Processing", filed Dec. 22, 2000.
U.S. Appl. No. 09/746,913, entitled "Knowledge Management System And Method", filed Dec. 22, 2000.
U.S. Appl. No. 09/950,205, entitled "Document Matching And Annotation Lifting", filed Sep. 10, 2001.

(Continued)

*Primary Examiner*—Stephen Hong
*Assistant Examiner*—Matthew J. Ludwig
(74) *Attorney, Agent, or Firm*—Fay, Sharpe, Fagan, Minnich & McKee, LLP

(57) ABSTRACT

An interactive document processing system includes a display screen that is coupled to a processing device. In addition, the document processing system includes an input device for viewing all or a portion of a hardcopy document on a work surface. The input device generates signals representing the appearance of the hardcopy document from representative electronic data stored in a print memory. In one embodiment, the processing device is connected to the input device to receive the signals, determine the position of a moving indicator relative to the document, and correlate the determined position with the electronic representation of the hardcopy document. The display screen provides information related to user commands that edit and/or select portions of the electronic representation of the hardcopy document.

15 Claims, 4 Drawing Sheets

OTHER PUBLICATIONS

Grasso et al., "Augmenting Recommender Systems by Embedding Interfaces into Office Practices", in: Proceedings of HICSS-33, Jan. 4-7, 2000, Island of Maui, Hawaii, USA.

O'Hara, Kenton and Sellen, Abigail. "A Comparison of Reading Paper and On-Line Documents". In Proceedings of CHI'97 (pp. 335-342). New York: ACM Press, 1997.

"Richo E-Cabinet" available on the Internet on Oct. 18, 2001 at http://www.doculex.com/Doculex_Products/ricoh_ecabinet.htm.

Stevens et al, "Automatic Processing Of Document Annotations", Proceedings Of The BMVC, 1998, vol. 2, pp. 438-446.

"Welcome to SmartPrinter", XRCE Coordinated Technologies, available on the Internet on Nov. 1, 2000 at http://www.xrce.xerox.com/research/ct/projects/smartprinter/home.html.

Yasuhito Suenaga, "A Facsimile Based Text Editor Using Handwritten Mark Recognition", Proceedings Of The Sixth International Joint Conference On Artificial Intelligence, Tokyo, Aug. 20-23, 1979, vol. 2, pp. 856-858.

Yasuhito Suenaga and Masakazu Nagura, "A Facsimile Based Manuscript Layout And Editing System By Auxiliary Mark Recognition", Fifth International Conference On Pattern Recognition, IEEE, Dec. 1-4, 1980, pp. 856-857.

Yasuhito Suenaga, "Some Techniques For Document And Image Preparation", Systems And Computers In Japan, vol. 17, No. 3, 1986, pp. 35-46.

\* cited by examiner

SYSTEM FOR PROCESSING ELECTRONIC DOCUMENTS USING PHYSICAL DOCUMENTS

BACKGROUND OF INVENTION

The invention relates to an interactive document processing system, and in particular to the use of a document to input control instructions to the processing system.

In a conventional document processing system, the operator is provided with a user interface including input devices, typically a keyboard and mouse, and a display screen to enable the user to view the operation of the system. The user can then issue instructions to the computer such as editing instructions relating to the text of a document, or other control functions.

Recently, some techniques have been developed to provide an alternative way of entering control instructions and in particular editing functions to the processing system. These have involved placing markings on a paper version of a document, for example editing marks or data glyph codes, and then scanning the document. The processing system detects the editing marks and/or glyph codes and performs the required function. One example of this approach is described in PCT publication Nos. WO-99/50787-A1, WO-99/50751-A1, and WO-99/50736-A1.

Other examples of this approach are described in "A Facsimile Based Text Editor Using Handwritten Mark Recognition", by Y. Suenaga, Proceedings Of The Sixth International Joint Conference On Artificial Intelligence, Tokyo, Aug. 20–23 1979, Vol. 2, pages 856–858; "A Facsimile Based Manuscript Layout And Editing System By Auxiliary Mark Recognition", by Suenaga et al, Fifth International Conference On Pattern Recognition, IEEE, 1–4 Dec. 1980, pages 856–857; and "Some Techniques For Document And Image Preparation", by Y. Suenaga, Systems And Computers In Japan, Vol. 17, No. 3, 1986, pages 35–46.

In these disclosures, the manuscript-amended page is scanned using a flat bed scanner or the like to generate electronic versions of the document and editing marks. The processor then identifies the editing marks that are then used to modify an electronic version of the document. This is a relatively slow batch process and requires that the editing be completed to the user's satisfaction before the document is scanned. Furthermore, if the user wishes to use the same approach to achieve a further modification, the user must print the amended document, amend it again and rescan it.

U.S. Pat. No. 5,511,148 and European Patent Application No. EP-A-0568161 describe a method of modifying a document being copied. In these disclosures, the hardcopy document is recorded using a camera and the result of modifying the hardcopy document is projected onto the same work surface as the hardcopy document either superimposed on the hardcopy document or beside it. It would therefore be advantageous not to require that the input and output displays of hardcopy document are tightly coupled.

SUMMARY OF INVENTION

In accordance with one aspect of the present invention, there is provided an interactive document processing system that includes a memory for recording image data of a rendered hardcopy document, a display screen, and a processing device coupled to the display screen. In addition, the interactive document processing system includes an input device for recording signal data and communicating the signal data to the processing device. The signal data represents at least a portion of the hardcopy document. The processing device in response to receiving the signal data from the input device: identifies the image data in the signal data using the memory; identifies annotations in the signal data by comparing the image data with the signal data; and modifies the image data recorded in the memory in accordance with the annotations.

In accordance with another aspect of the invention, there is provided a document processing system that includes a memory and a processor coupled to the memory for receiving a print request. The processor satisfies the print request by: (a) rendering a hardcopy document of the print request; the hardcopy document being rendered with an identifier thereon; (b) storing in the memory the identifier and an electronic representation of the rendered hardcopy document; (c) providing the electronic representation of the rendered hardcopy document in response to receiving a request therefor with the identifier; and (d) using the electronic representation to identify annotations applied to the rendered hardcopy document.

With this invention, the document is used for providing input to the processing device while a display screen is used to provide information to a user related at least to the position of the indicator relative to the document, which typically includes a display of the electronic representation of the document. In addition, the processing device is further adapted to perform a process on the electronic representation of the document related to the determined position or area. The display screen provides information related to the process. This is advantageous in that it more closely mirrors conventional document processing systems with which operators are familiar but enables the flexibility of using the document itself to provide input.

In operation, the input device responds solely to the appearance of the document and movement of an indicating device such as a stylus or finger. However, at least one further input device may be provided such as a keyboard or mouse. The result of this is that the document input side provides an additional input capability to a more conventional processing system so that the system can be configured to optimize the way in which control instructions are input to the processing device. For example, the control instructions may include instructions such as: moving the electronic representation of the document displayed to a position, inserting the cursor at the location being pointed to on paper, highlighting an area in the displayed electronic representation of the document, making changes to a highlighted area, etc. Such control instructions are similar in nature to those commonly available with any word processor.

The input device is preferably adapted for both viewing the document and providing feedback on the position of the indicator. The input device can take a variety of forms providing it is capable of monitoring the position of the moving indicator at regular intervals. In its simplest form, the input device comprises one or more video cameras that are analogue or digital but other types of input device are envisaged. These could include digital still cameras, for example making use of CCD (Charge Coupled Device) technology. Stylus readers and touch tablets are also envisaged. It should also be noted that the input device does not need to view the entire document. In this case, if the stylus acts as a marker or a pointer, the processing device could respond to the marks and/or gestures made on the document rather than to the stylus itself.

One aspect of the invention is aligning the part of the document being viewed by the input device and the corresponding electronic representation of the document. This can be achieved in a variety of ways. For example, if a separate input device such as a keyboard is provided, the operator can select the corresponding part of the electronic representation of the document manually. Conveniently, however, the processing device is adapted to carry out the correlation step by identifying at least one alignment point on the document. The alignment point could comprise a designated mark provided on the document or part of the content of the document itself such as a text string, graphic or the like.

Thus, marks on the document could give information about which page is being looked at and where on the page the user is pointing. This could be used to compute exactly where in the document the user is pointing. Marks could be done by codes such as data glyphs, barcodes, etc. Computing by document content could be accomplished using OCR (Optical Character Recognition) of text and searching, or by identifying structural patterns of image on the page and using these as an index for example. Such structural patterns include the graphical layout such as relationship between headings, paragraphs in body text and graphics; the shapes of paragraphs; and the patterns of word spacing.

The electronic representation of the document could be retrieved by separately inputting a document's identification but conveniently the processing device is adapted to identify the electronic representation of the document from the appearance of the document received from the video input device. There are known methods for achieving this as will be described in more detail below. Also, the process which is performed by the processing device on the electronic representation of the document can be of any conventional form and include one or more operations such as editing and navigating, creating cross-references, copying to another document or emailing.

BRIEF DESCRIPTION OF DRAWINGS

These and other aspects of the invention will become apparent from the following description read in conjunction with the accompanying drawings wherein the same reference numerals have been applied to like parts and in which.

DETAILED DESCRIPTION

Figure 1:
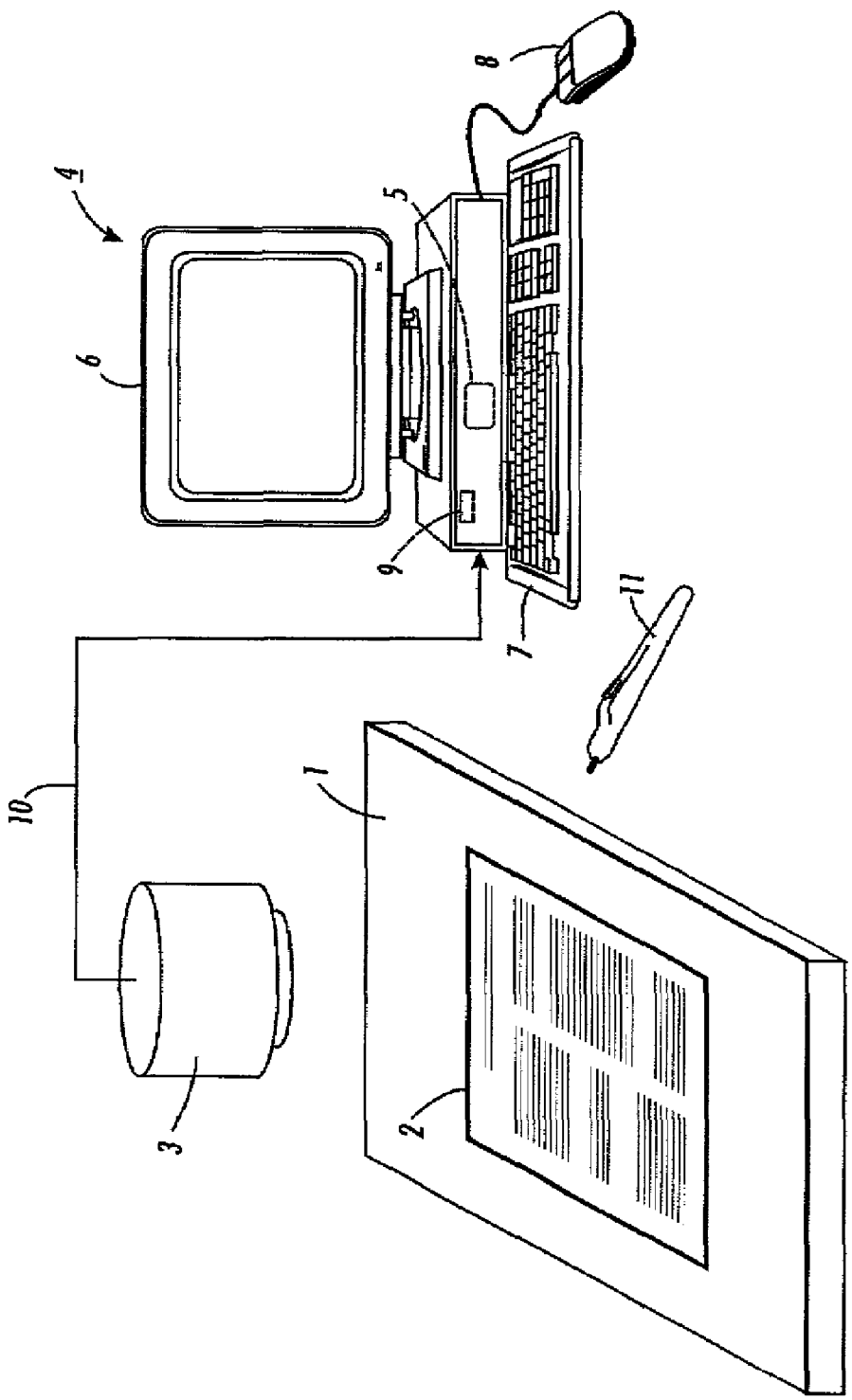
FIG. 1 illustrates one embodiment of an interactive document processing system for carrying out the present invention.

FIG. 1 illustrates one embodiment of an interactive document processing system for carrying out the present invention. FIG. 1 illustrates a work surface 1 which can be any surface such as a physical desktop or the like on which is provided a document 2 to be processed. The document 2 may take a variety of hard copy forms such as paper or transparency. Alternatively, the document 2 can be represented in hardcopy form using a reusable material such as electronic paper. The contents of the document may include any combination of text, graphics, and images.

Figure 2:
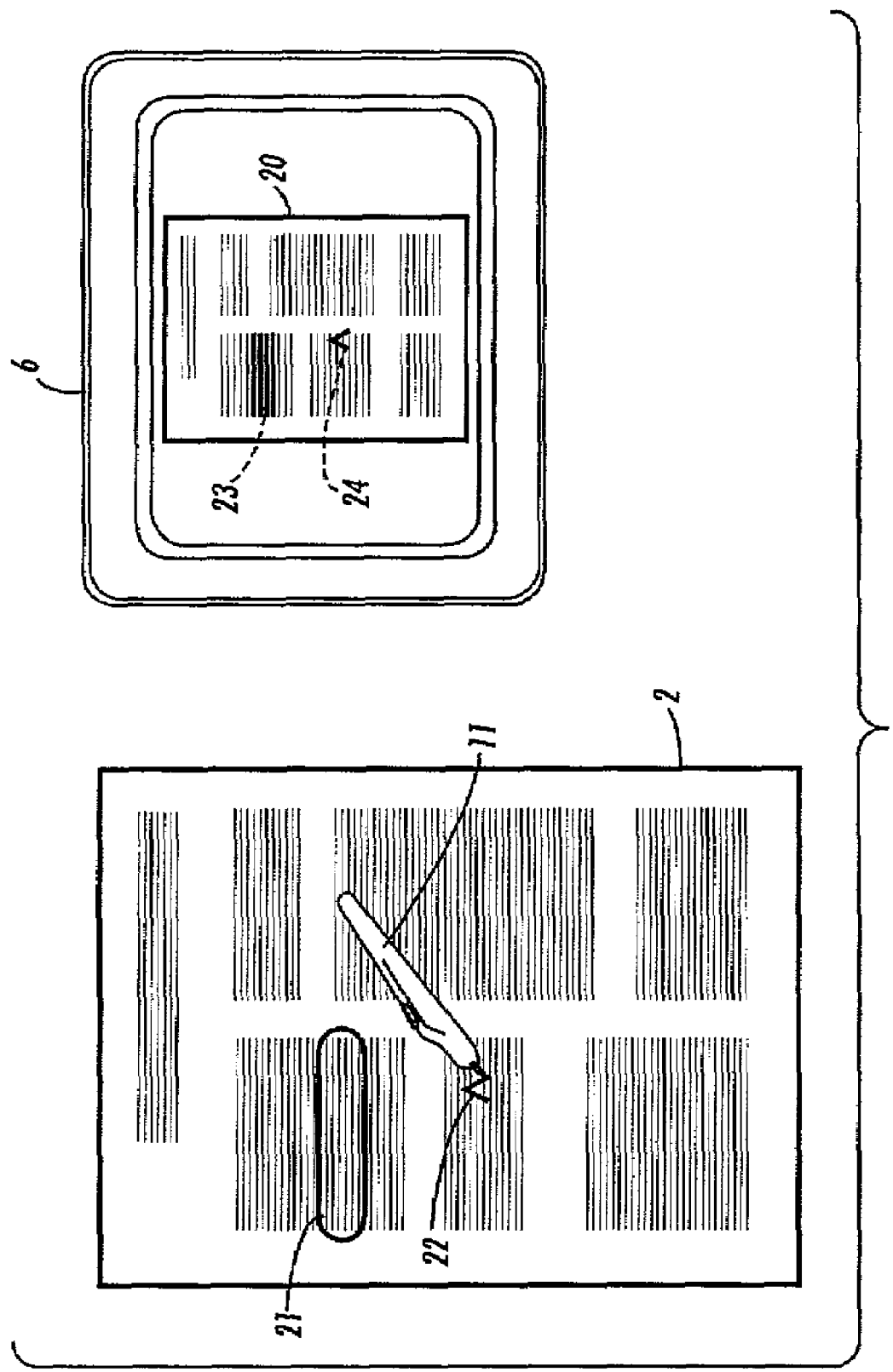
FIG. 2 illustrates an example of instruction marks on the document and their corresponding electronic annotations on an electronic representation of the document.
Figure 3:
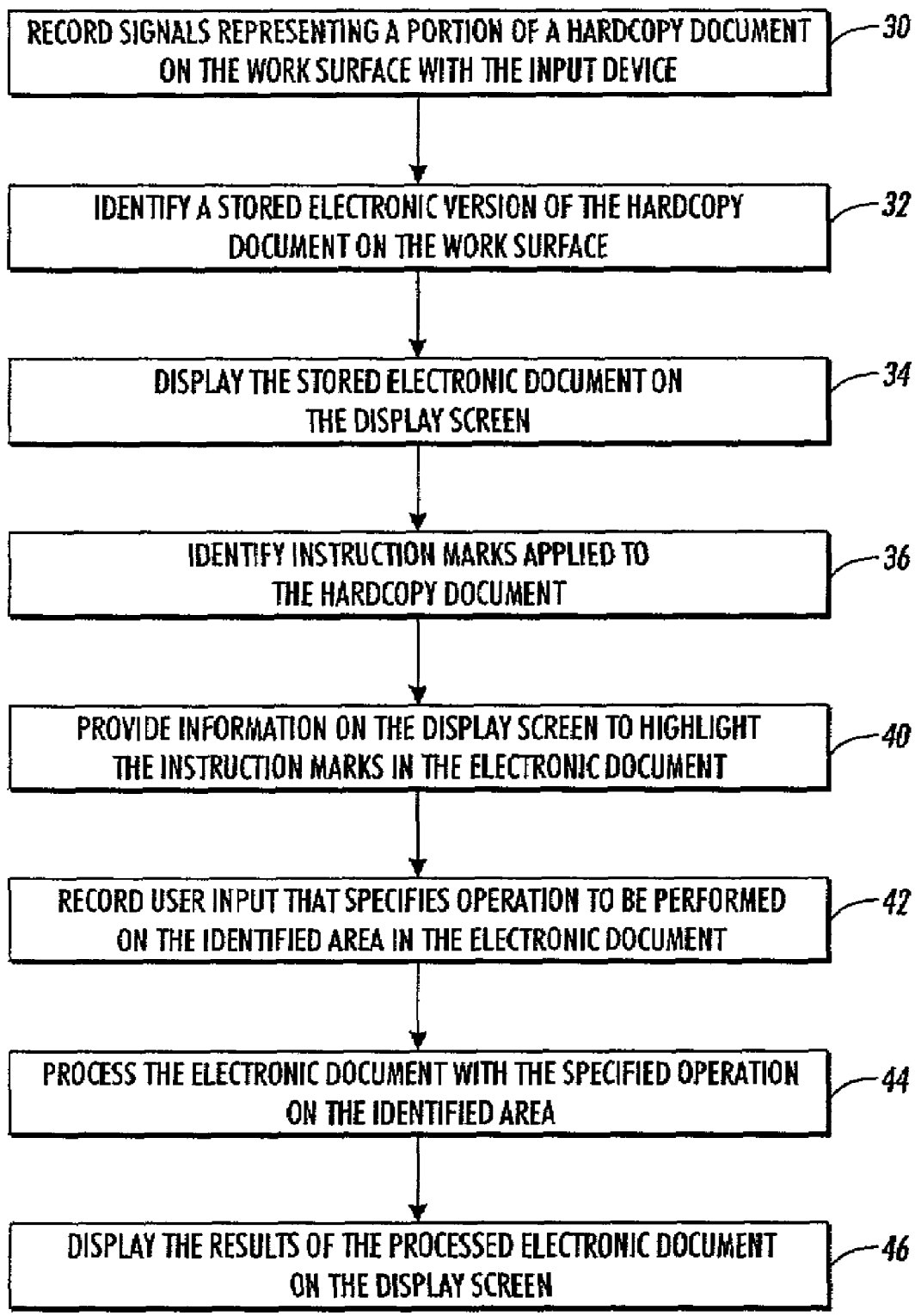
FIG. 3 depicts a flow diagram of a process for performing the present invention.
Figure 4:
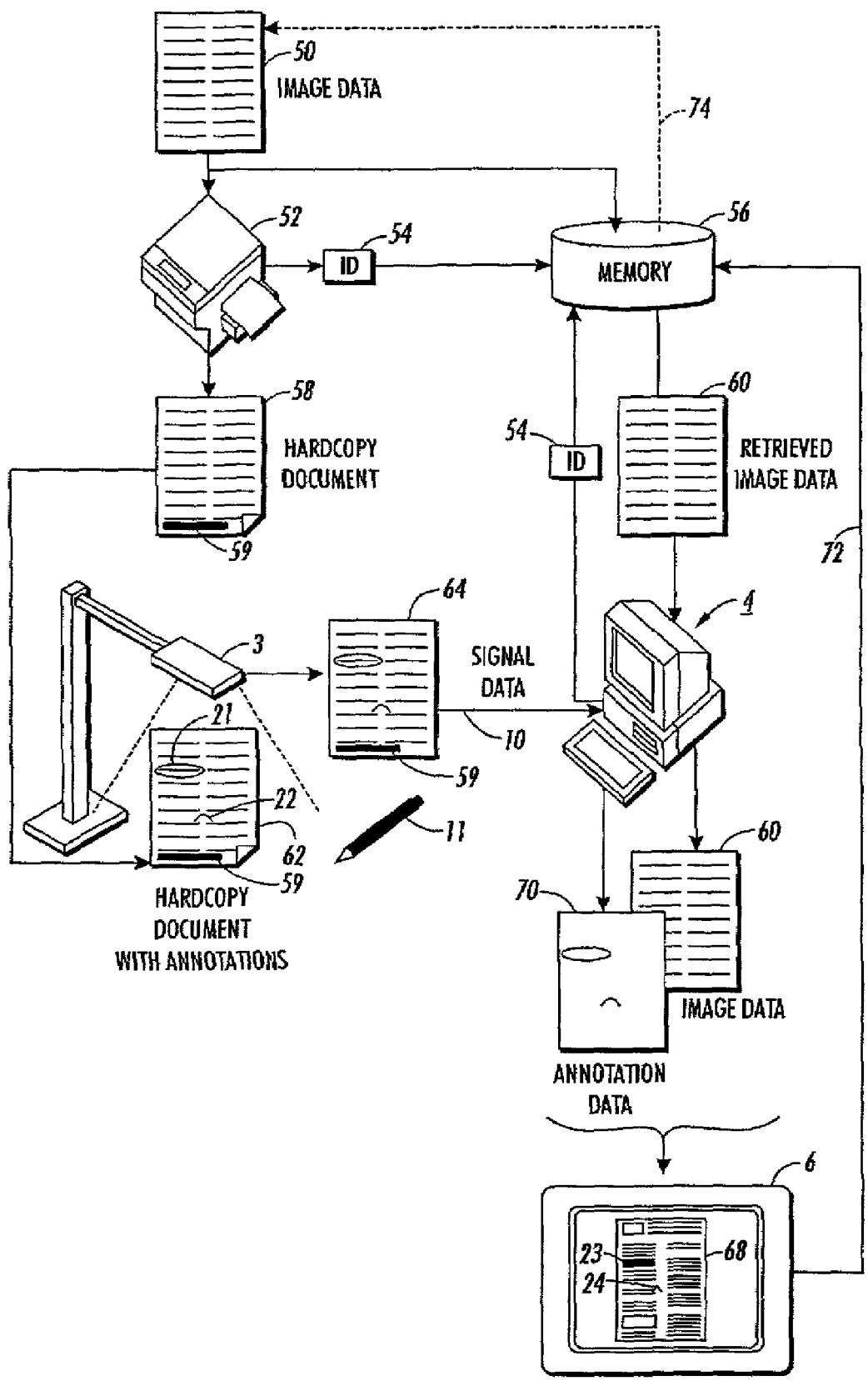
FIG. 4 illustrates an alternate embodiment of an interactive document processing system for carrying out the present invention.

By way of overview, FIG. 2 illustrates an example of instruction marks applied to the document 2 and their corresponding electronic annotations on an electronic representation 20 of the document 2. FIG. 3 is a flow diagram that depicts the process performed in manipulating the electronic representation 20 of the document 2 using the document 2. FIG. 4 illustrates an alternate embodiment of the interactive document processing system for carrying out the present invention.

In one embodiment, an input device, such as a camera, located above the work surface 1 records signal data of the document on the work surface. The camera 3 may have a field of view that can be positioned to view part of the work surface to which an operator wishes to record. Alternatively, the camera may have a field of view that extends across the entire work surface 1 so that it can view a document 2 wherever it is located on the surface 1. It will be appreciated by those skilled in the art that OCR may become more difficult especially for low camera resolution the more surface area recorded by the camera.

The camera 3 can be an analogue or digital camera and generates video signals in either analogue or digital form that are fed via a line 10 to a Personal Computer (PC) 4. The PC 4, or more generally computing device, has a processor 5 coupled to a monitor 6, a keyboard 7, and a mouse 8. The processor 5 is also connected to a memory 9 for storing electronic representations of documents. Computing device may take a plurality of forms other than the PC shown in the Figures that include but are not limited to, phones, PDAs (Personal Digital Assistants), and communicators. Such computing devices may have a camera directly embedded therein or operatively coupled thereto.

The system also includes a stylus 11. In the embodiment shown in FIG. 1, the stylus 11 is a passive instrument whose location relative to the document is detected by the camera 3. In this embodiment, the camera 3 is used to record the operator's movements by monitoring the stylus movements. In addition, the stylus 11 may include a marking material such as ink so that the user can place marks on the document 2 which can then be read by the camera 3 and processed, together with or independent from the movement of the stylus. In place of the passive stylus 11, an operator of the stylus can use any other pointing device such as a finger.

In yet another embodiment, the stylus is not a passive instrument but an active input device. In this embodiment, the stylus uses a sensor to indicate its position on the work surface 1 relative to the document or alternatively cooperates with a digitizing table defining the work surface 1. In addition to emitting positional information, the stylus may include, for example, an infrared detector, CCD, or other device capable of reading marks on a small area of the document 2.

In the example shown in FIG. 2, physical ink markings are formed on the document 2. In an alternate embodiment, the processor 5 interprets and responds to movements of the stylus 11, when an IR LED is activated (Infra-Red Light Emitting Diode), so that the original document 2 remains unmarked. The processor 5 can also respond to movements of the stylus when there is no IR LED. Other techniques such as laser-generated spot on the end of the stylus can also aid detection of physical markings or movements.

A single camera 3 is shown in FIG. 1, which may be a high or low-resolution camera that provides a view of all or part of the document 2. In an alternate embodiment, a plurality of one or more cameras may be cooperatively coupled to provide views of additional parts of the document and/or higher resolution views so that the appearance of, and in particular text on, the document can be recognized more easily and accurately. An example of a multi-camera system is described in U.S. Pat. No. 6,493,469 entitled "Dual Video Camera System For Scanning Hardcopy Documents", which is incorporated herein by reference.

The processor 5 in PC 4 is programmed to carry out conventional editing operations and other operations commonly available with a conventional document processing application (e.g., word processing application, spreadsheet application, illustration application), on an electronic representation of the document 2 stored in the memory 9. Editing operations of conventional word processing instructions are generally controlled by an operator using either the keyboard 7 or the mouse 8 or both while viewing the document on the monitor 6. In the present invention, however, part or all of the editing operations are controlled by referring to the document 2 itself using manual gestures or the movements of a pointer or stylus, which are received and processed in real time by the processor in PC 4 as editing operations to be performed on an electronic representation of the document 2 stored in the memory 9.

More specifically, a user places the document 2 on the work surface 1 while the appearance of an electronic representation of the document is provided on the monitor 6. The electronic representation of the document can be initially received by the PC 4 from any conventional digital storage medium for example on disk, CD or downloaded from a network or via e-mail to the processor 5.

Once the electronic representation 20 of the document 2 is received, it is stored in the memory 9 for display on monitor 6. The electronic representation of the document can either be retrieved as a result of the operator entering suitable retrieval commands via the keyboard 7, or automatically as a result of determining the appearance of all or part of the document 2 on the work surface 1 using the camera 3.

One method for automatic retrieval is described in more detail in U.S. Pat. No. 5,299,026, which is incorporated herein by reference. In this case, the processor 5 uses the content of the document 2 as obtained via the camera 3 to locate the previously stored electronic representation. Other methods of automatically identifying the electronic representation of the document are possible, for example using structural patterns in images obtained by the camera 3.

As well as retrieving the correct document, the processor 5 also determines a correlation between the input image and the correct portion of the retrieved document. For example, the electronic representation of the document may represent several physical pages and the processor 5 may need to determine which part of the document is represented on the work surface 1. This can be done using OCR methods, word segmentation, document edge information and the like to identify alignment points that define relationships between at least one of: text strings, headings, paragraphs, graphics, shapes of paragraphs, and patterns of word spacing. One such method is described in "Automatic Processing Of Document Annotations", Stevens et al, Proceedings Of The BMVC, 1998, Vol. 2, pages 438–446 which describes a string matching approach.

Once the processor 5 displays on the monitor 6 an electronic representation of the document 2 as shown at 20 in FIG. 2, the processor 5 can identify points of the document 2 within the electronic representation of the document stored in memory 9. Subsequently, the user indicates regions (for example words) on the document 2 which the user wishes to operate on. This is done using his finger or, for more accurate work, the stylus 11 which may itself generate a signal such as an infrared or visible signal.

In the embodiment shown in FIG. 2, the stylus 11 is used to physically mark and annotate the document 2 with ink using freeform instruction marks 21 and 22. In an alternate embodiment, a user can use marking gestures without actually applying marks. In yet another embodiment, a control panel (not shown) may be provided to which the user can point with the stylus, located for example on work surface 1 alongside the document 2 as an alternative/additional way of identifying the operation to be carried out. In any embodiment, the stylus may be active or passive as described above. In the example shown in FIG. 2, the annotated instruction mark 21 indicates a selected block of text that is to be moved while the annotated instruction mark 22 indicates a location where the selected block of text is to be inserted.

By monitoring successive video frames supplied from the camera 3, the processor 5 can distinguish between original markings on the document 2 and the movements of the stylus 11 and the creation of instruction marks 21 and 22. The processor then analyses the instruction marks 21 and 22 and determines one or more editing functions to which each corresponds. Thus in the example shown in FIG. 2, the processor 5 determines that it is being asked to move a block of text defined within the instruction mark 21 to the location defined by the instruction mark 22.

After determining the editing functions of the instruction marks 21 and 22, the processor 5 can then represent these instruction marks in the electronic representation 20 of the document 2 on the monitor 6. In one embodiment, the instruction marks 21 and 22 are represented prior to implementing them by suitably electronic annotations corresponding portions of the electronic representation 20 of the document 2 on the monitor 6. Specifically, the selected block of text identified by instruction mark 21 is identified by electronic annotation 23 and its insertion point identified by instruction mark 22 is identified by electronic annotation 24.

If the user finds the electronic annotations accurately represent the instruction marks, then the user provides a suitable input instruction indicating the electronic representation is accurate. The user can generate the input instruction indicating that the electronic representation is accurate or inaccurate using the stylus 11 and document 2. In alternate embodiments, a user can generate the input instruction indicating that the electronic representation is accurate or inaccurate using additional input devices such as, for example, the keyboard 7, the mouse 8, and a microphone (e.g., using audio commands).

If the electronic annotations are found to be inaccurate, the processor 5 computes new electronic annotations using additional information from the user. Once the user through input instructions has accepted the electronic annotations, the processor performs editing functions (e.g., amendments, insertions, deletions, etc.) corresponding to the instruction marks 21 and 22 as electronically annotated at 23 and 24 in the electronic representation 20 of the document 2, respectively. In an alternate embodiment, the changes indicated by the instruction marks are not implemented but simply kept in a separate electronic file, for example, for future reference.

It will be appreciated that a wide variety of instruction marks can be provided in real time to the processor 5 via the document 2. Alternatively, some or all instruction marks could be generated "off-line" by annotating or marking the document 2 before being placed under the camera 3. In this alternate embodiment, the processor 5 performs an initial scan of the document to detect off-line annotations or marks and indicate the one or more instructions to which each corresponds for the user to subsequently accept.

It will also be appreciated that this system can be used to implement many or even all the editing functions found in conventional word processing packages. Examples of processes that can be carried out using the system described include selecting an area of a document to be edited using the stylus 11 and then entering new text via the keyboard 7. Certain text could be highlighted using the stylus 11 and then the format of the text changed via keyboard instructions. It will further be appreciated that there are many other combinations of operations that can be achieved using the document and one or more of the input devices described herein (e.g., stylus, mouse, keyboard, microphone, etc.).

In summary, the invention enables limited user interface functionality simply by interacting with the paper document while being viewed by the camera 3. This can include basic navigation through the document, highlighting sections on the electronic representation, deleting sections, and other operations.

More sophisticated functionality can be achieved by using this basic interaction in combination with traditional user interaction devices such as a keyboard and/or a mouse. This includes more fine-grain corrections such as fixing typos, inserting new text, etc. One of the important problems overcome is keeping track of discrepancies that emerge between the paper document and the electronic representation as changes are made. This can be achieved using known techniques (e.g., Microsoft® Word's track changes feature) for keeping track of changes in electronic documents to track changes made between a paper version (as represented by the electronic version corresponding to the time when the paper version was produced) and the current electronic representation.

In one embodiment, the interactive document processing system performs the operations set forth in the flow diagram shown in FIG. 3. Initially at 30, the input device 3 (e.g., analog camera, digital camera, scanner, stylus, etc.) records signals representing all or a portion of the document 2 on the work surface 1. At 32, in one embodiment the processor 5 of PC 4 identifies a stored (i.e., pre-existing) electronic document using the recorded signals. In one embodiment, the electronic document may be an electronic representation of the recorded signals of the document 2. Alternatively, the electronic document may represent only portions of the document 2. More generally, the processor 5 of PC 4 identifies pre-existing electronic data using the recorded signals.

The act of identifying pre-existing electronic document at 32 can be performed manually (i.e., with complete user intervention), automatically (i.e., with no user intervention), or a combination of the two (e.g., requiring user confirmation that the correct electronic representation has been identified by the system). In one instance, the pre-existing electronic document is retrieved from storage memory (e.g., disk, network server) and to memory 9 for access by the processor 5 of PC 4.

At 34, the pre-existing electronic document 20 of the document 2 is displayed on the display 6. At 36, instruction marks (e.g., 21 and 22) applied to the document with the input device 11 (e.g., stylus, finger, etc.) are identified. Instruction marks can be applied to the document with or without recording physical markings on the document.

At 40, electronic annotations (e.g., 23 and 24 shown in FIG. 2) that correspond to the instruction marks on the hardcopy document are displayed on the electronic representation of the document on the display. In one embodiment, if the electronic annotations are not acceptable to the user, then additional user input relating to the instruction marks is recorded and processed by the PC 4. This additional user input can come in the form of modified electronic annotations and/or modified instruction marks.

At 44, the electronic representation of the document is processed in accordance with editing operations that correspond to the electronic annotations accepted by the user. The resulting document as modified by the editing operations at 44 is subsequently displayed on the display 6 at 46.

FIG. 4 illustrates an alternate embodiment of an interactive document processing system for carrying out the present invention. In this embodiment, image data 50 in an electronic form is transmitted as part of a print request to printer 52. In one embodiment, the printer is a standalone printer that communicates directly with personal computers or workstations coupled thereto. In another embodiment, the printer 52 communicates with a print server that receives and pre-processes print requests.

In either embodiment, the printer 52 or printer/print server combination renders the image data and associates an identifier (ID) 54 with image data 50. In one embodiment, the identifier is printed directly on the hardcopy document 58 in the form of a bar code or data glyph as shown at 59. Such markings may or may not be visually obstructive to the image data 50 rendered on the hardcopy document 58.

The identifier may be either at a section, page, or document level, or a combination thereof. In one instance, a universal resource locator (URL) can be used to encode both the document and section or page level information of an area of a document. For example, each paragraph or image in a document may be associated with an identifier. In addition, the identifier may record a user identifier in addition to information identifying the image data.

In another embodiment, the identifier 54 of the image data 50 is encoded as part of a cover sheet as described in U.S. Pat. No. 6,873,430, which is incorporated herein by reference. (See also the following article by Grasso et al., entitled, "Augmenting Recommender Systems by Embedding Interfaces into Office Practices" In: Proceedings of HICSS-33, 4–7 Jan. 2000, Island of Maui, Hi., USA.) In this embodiment, the cover sheet can contain both the document identifier as well as an identifier of the user of the document.

In yet another embodiment, the identifier 54 of the image data 50 is encoded on the hardcopy document 58 with an edge that is pre-marked, as described in U.S. Pat. No. 6,585,163, which is incorporated herein by reference. Such an encoding allows each sheet of a hardcopy document to be uniquely identified by the edge pre-marking at paper production time. In this embodiment, each hardcopy sheet is associated with image data rendered thereon at print time.

In yet a further embodiment, the identifier 54 is defined by the content of the image data 50. The identifier 54 in this embodiment may, for example, be defined using (a) biographic information relating to the document such as title and author, (b) context information that relates to the location and/or time at which the document is rendered, and/or (c) document properties that may include information on the document that identifies, for example, the number of pages of the document (e.g., page numbers that identify the page as well as how many pages are in a document—"page x of y") and relationships between at least one of: text strings, headings, paragraphs, graphics, shapes of paragraphs, and patterns of word spacing.

In addition to encoding in some form an identifier of the image data with the hardcopy document, the identifier 54 and one or more forms of the image data 50 associated with the hardcopy document 58 are stored in a memory 56. In one embodiment, this information is seamlessly captured in the stream of the print request using a virtual printer that is adapted to capture this information in the print memory. The virtual printer, which is associated with the physical printer 52, subsequently transmits a print request to the physical printer for rendering the image data and in some form the identifier 54 on a hardcopy document.

The memory 56 records either the image data 50 in its highest-level form (e.g., Microsoft Word document format) or in a lower "print ready" form (e.g., such as in a PostScript, TIFF, bitmap, or PDF file format). Identifiers and image data recorded in the memory may be recorded in a workgroup memory. In addition or alternatively, the memory can be personalized for each user, so that access to the memory is allowed only with proper user identification. Such identification may require different levels of security for access to the memory.

Given the rendered the hardcopy document 58, a user subsequently annotates it using stylus 11 as described above using either markings or gestures to produce annotated document 62. These markings 21 and 22 (or gestures not shown) are recorded by the input device 3 (e.g., camera) and output through line 10 in the form of signal data 64.

The processor in PC 4 processes the signal data 64 to decode the identifier 59 from the signal data 64. As set forth above, the identifier 59 on the hardcopy document 58 may be defined using one of a plurality of forms. Accordingly, in processing the signal data 64, the PC 4 may depending on the form of the identifier 59, use one or more techniques to decode the identifier 59. Once the identifier 59 is decoded to identifier 54, the identifier 54 is used to retrieve from the memory 56 one or more forms of image data 50, which is identified in the Figure by reference number 60.

One of the forms of the image data 60 is then compared with the signal data 64 (e.g., by taking the difference of the two images) to identify annotation data 70. One method for identifying the difference of two images is disclosed in U.S. patent application Ser. No. 09/950,205, entitled "Document Matching And Annotation Lifting", which is incorporated herein by reference.

From these annotations 70 that have been identified, editing functions of instructions marks are determined as described above and represented on one of the forms of the image data 60 on display 6 as indicated by reference number 68.

Subsequently, either automatically or in response to a user acknowledgement as described above, the image data 60 is modified in memory 56 by PC 4 in accordance with the instructions marks in the annotation data 70 represented on the display 6 in the electronic representation 68, as indicated by reference number 72. Depending on whether the memory is accessible by groups of users or individual users, different versions of the image data 60 modified in accordance with user instruction marks may be present in the memory 56.

It will be appreciated by those skilled in the art that the present invention permits a cycle of edits, navigation, and/or selection to be performed to image data 50 originally printed on hardcopy document 58 and stored in the memory 56, as indicated by reference number 74. Thus, advantageously, in accordance with one aspect of the invention, an electronic document may be repeatedly edited through a hardcopy representation.

It will also be appreciated by those skilled in the art that the interactive document processing system described herein include software components and hardware components, and that such computer components can be either a personal computer, workstation, a mobile/cellular phone, a handheld device etc.

The hardware components may include a Central Processing Unit (i.e., CPU), Random Access Memory (RAM), Read Only Memory (ROM), User Input/Output ("I/O"), and network I/O. The User I/O may be coupled to various input and output devices, such as a keyboard, a cursor control device (e.g., pointing stick, mouse, etc.), a display, a floppy disk, a disk drive, an image capture device (e.g., scanner, camera, bar code reader), etc.

RAM is used by CPU as a memory buffer to store data. A display is an output device that displays data provided by CPU or other components in a computer system. In one embodiment, display is a raster device. Alternately, the display may be a CRTs or LCD. Furthermore, user I/O may be coupled to a floppy disk and/or a hard disk drive to store data. Other storage devices such as nonvolatile memory (e.g., flash memory), PC-data cards, or the like, can also be used to store data used by computer system.

The network I/O provides a communications gateway to a network (not shown) such as a LAN, WAN, or the Internet. The network I/O is used to send and receive data over a network connected to one or more computer systems or peripheral devices.

The software components include an operating system software, application program(s), and any number of elements of the interactive document processing system. It should be noted that not all software components are required for all the described embodiments. The operating system software may represent an MS-DOS, the Macintosh OS, OS/2, WINDOWS®, WINDOWS® NT, Unix operating systems, Palm operating system, or other known operating systems. Application Program(s) may represent one or more application programs such as word processing programs, spreadsheet programs, presentation programs, auto-completion programs, editors for graphics and other types of multimedia such as images, video, audio etc.

The interactive document processing system may be implemented by any one of a plurality of configurations. For example, processor may in alternative embodiments, be defined by a collection of microprocessors configured for multiprocessing. In yet other embodiments, the functions provided by software components may be distributed across multiple computing devices (such as computers and peripheral devices) acting together as a single processing unit. Furthermore, one or more aspects of software components may be implemented in hardware, rather than software. For other alternative embodiments, the computer system may be implemented by data processing devices other than a general purpose computer.

Using the foregoing specification, the invention may be implemented as a machine (or system), process (or method), or article of manufacture by using standard programming and/or engineering techniques to produce programming software, firmware, hardware, or any combination thereof.

Any resulting program(s), having computer-readable program code, may be embodied within one or more computer-usable media such as memory devices or transmitting devices, thereby making a computer program product or article of manufacture according to the invention. As such, the terms "article of manufacture" and "computer program product" as used herein are intended to encompass a computer program existent (permanently, temporarily, or transitorily) on any computer-usable medium such as on any memory device or in any transmitting device.

Executing program code directly from one medium, storing program code onto a medium, copying the code from one medium to another medium, transmitting the code using a transmitting device, or other equivalent acts may involve the use of a memory or transmitting device which only embodies program code transitorily as a preliminary or final step in making, using, or selling the invention.

Memory devices include, but are not limited to, fixed (hard) disk drives, floppy disks (or diskettes), optical disks, magnetic tape, semiconductor memories such as RAM, ROM, Proms, etc. Transmitting devices include, but are not limited to, the Internet, intranets, electronic bulletin board and message/note exchanges, telephone/modem based network communication, hard-wired/cabled communication network, cellular communication, radio wave communication, satellite communication, and other stationary or mobile network systems/communication links.

A machine embodying the invention may involve one or more processing systems including, but not limited to, CPU, memory/storage devices, communication links, communication/transmitting devices, servers, I/O devices, or any subcomponents or individual parts of one or more processing systems, including software, firmware, hardware, or any combination or subcombination thereof, which embody the invention as set forth in the claims.

The invention has been described with reference to a particular embodiment. Modifications and alterations will occur to others upon reading and understanding this specification taken together with the drawings. The embodiments are but examples, and various alternatives, modifications, variations or improvements may be made by those skilled in the art from this teaching which are intended to be encompassed by the following claims.

The invention claimed is:

1. An interactive document processing system, comprising:
    a memory for recording image data of a rendered hardcopy document;
    a display screen;
    a processing device coupled to the display screen; and an input device for recording signal data; the input device communicating the signal data to the processing device; the signal data representing at least a portion of the hardcopy document;
    wherein the processing device in response to receiving the signal data from the input device includes:
    identifying the image data in the signal data using the memory;
    identifying annotations in the signal data by comparing the image data with the signal data;
    modifying the image data recorded in the memory in accordance with the annotations;
    wherein the memory records an identifier associated with the image data; the identifier being rendered on the hardcopy document; the identifier and image data being recorded in the memory in response to rendering a hardcopy representation of the image data; and
    wherein the processing device recovers the identifier from the signal data and uses the identifier to retrieve the image data from the memory.

2. A system according to claim 1, further wherein modifying the image data further comprises:
    modifying the image data in accordance with the command data;
    displaying the modified image data on the display screen; and
    responsive to an acceptance signal from the user of the interactive document processing system, updating the image data of the hardcopy document in the memory with the modified image data.

3. A system according to claim 2, wherein the input device is a camera.

4. A system according to claim 1, further comprising a stylus.

5. A system according to claim 4, wherein the stylus further comprises: an embedded camera; and a transmitter that communicates signals from the camera to the processing device.

6. A system according to claim 4, wherein the stylus includes an accelerometer for recording gestures.

7. A system according to claim 4, wherein the annotations correspond to command data specifying one of editing, navigating, creating cross-references, copying, distributing, and filing.

8. A system according to claim 4, wherein the stylus includes a marker for laying down marks on the document; and wherein the camera detects the marks in order to determine annotations.

9. A system according to claim 4, wherein the stylus includes a pointer for simulating marks on the document; and wherein the camera detects the simulated marks in order to determine instruction marks.

10. A system according to claim 1, wherein the annotations are defined by recording one of: markings on the hardcopy document; gestures on the hardcopy document; and signals from a command sheet.

11. A system according to claim 1, wherein the input device comprises an electronic pen with an embedded processing device for performing OCR and transmitting textual content to the processing device coupled to the display screen.

12. A system according to claim 1, wherein the input device is adapted to record the document and provide position information of the input device relative to the hardcopy document.

13. A system according to claim 1, further comprising at least one further input device for recording user input.

14. A system according to claim 1, further comprising using at least one alignment point to identify relationships between at least one of: characters, text strings, headings, paragraphs, graphics, shapes of paragraphs, and patterns of word spacing; the at least one alignment point providing alignment between the signal data and the image data.

15. A system according to claim 1, wherein the identifier is one of a bar code, a glyph tag, and a paper edge marking.

* * * * *